Jan. 31, 1967   P. ISAAC   3,300,910
REELABLE STRUCTURAL MEMBERS
Filed Dec. 10, 1965   3 Sheets-Sheet 1

INVENTOR.
PETER ISAAC

Jan. 31, 1967   P. ISAAC   3,300,910
REELABLE STRUCTURAL MEMBERS
Filed Dec. 10, 1965   3 Sheets-Sheet 2
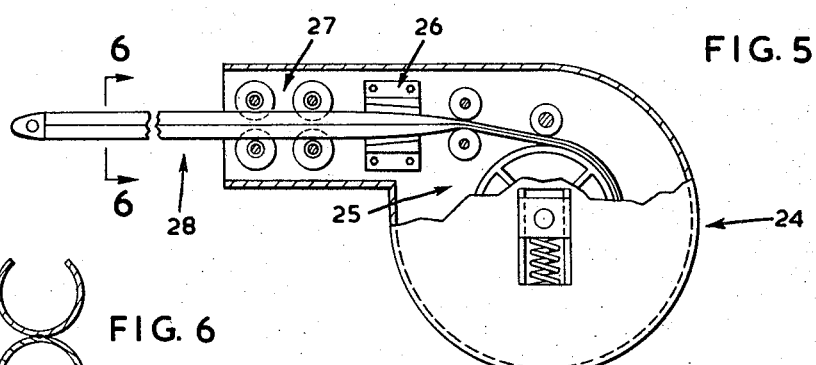
FIG. 5
FIG. 6
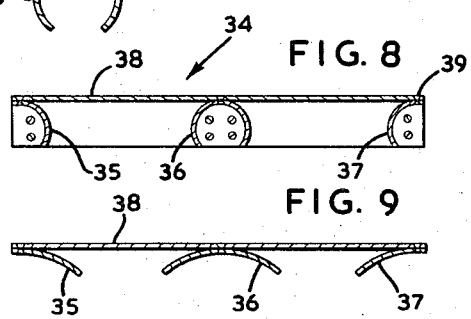
FIG. 8
FIG. 9
FIG. 7
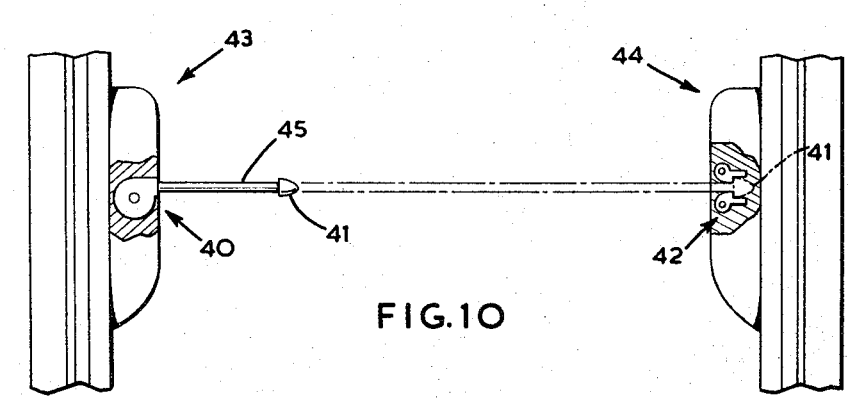
FIG. 10
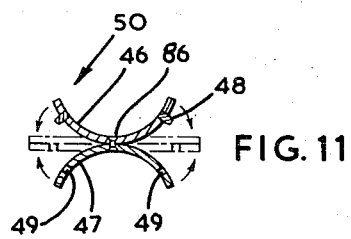
FIG. 11
INVENTOR.
PETER ISAAC Jan. 31, 1967  P. ISAAC  3,300,910
REELABLE STRUCTURAL MEMBERS
Filed Dec. 10, 1965  3 Sheets-Sheet 3
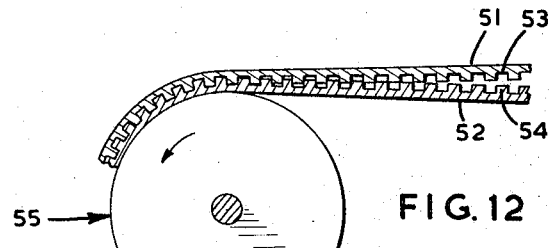
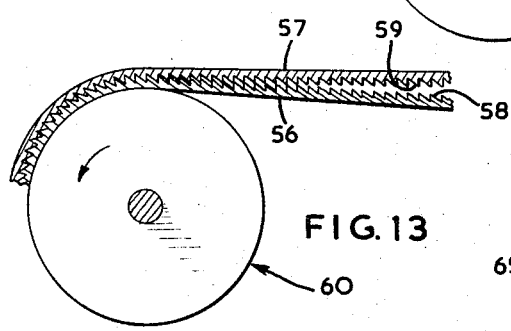
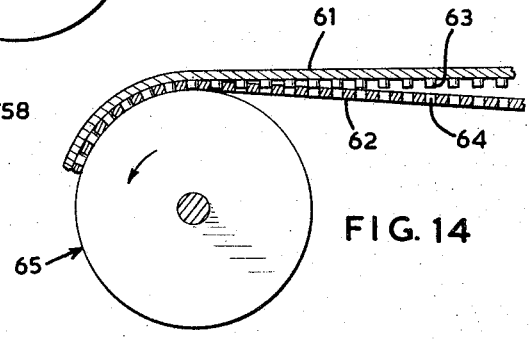
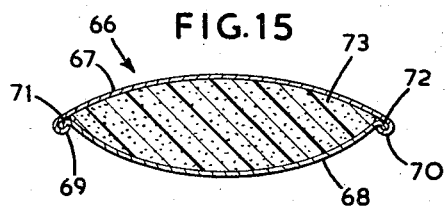
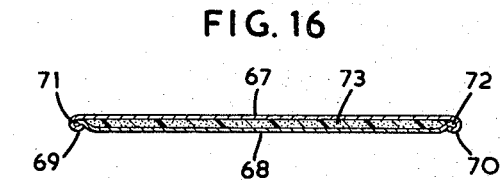
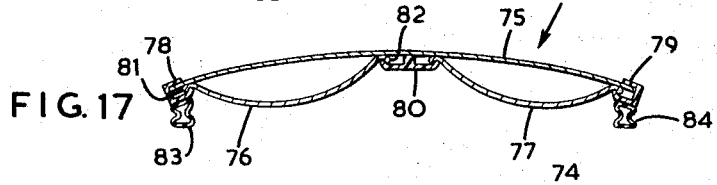
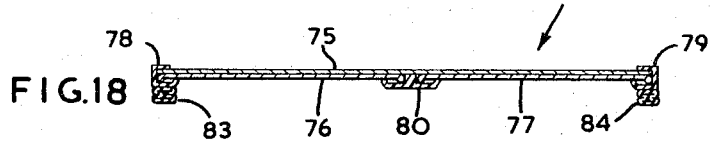
*INVENTOR.*
PETER ISAAC

United States Patent Office 3,300,910
Patented Jan. 31, 1967

3,300,910
REELABLE STRUCTURAL MEMBERS
Peter Isaac, 9 Crown Hill Place, Apt. 410,
Toronto, Ontario, Canada
Filed Dec. 10, 1965, Ser. No. 513,140
20 Claims. (Cl. 52—2)

My invention pertains to improvements to Inflatable Structural Members as covered by my U.S.A. patent application, Serial No. 485,147 and to improvements to Reelable Structural Members as covered by my U.S.A. patent application, Serial No. 391,831.

The object of this invention is to provide improved means of interlocking interfacing strips or sheets of the members referred to while they are on the reel, and thereby prevent the relative interfacial displacement which tends to occur.

A further object of this invention is to provide new types of reelable structural members where interfacial displacement of the strips or sheets of such members is deliberately allowed to occur.

With the foregoing objects and purposes in view and such others as may become apparent as this specification proceeds, the present invention consists of the following parts, reference being had to the accompanying figures in which:

FIGURE 5 illustrates a reelable structural member of the non-inflatable types to which my invention is applicable.

FIGURE 6 is a cross-sectional view along the lines 6—6 of FIGURE 5 illustrating the components to which my invention is applicable.

FIGURE 7 is a cross-sectional view of an alternative type of reelable member which is specially applicable to uses such as a belt gate or safety belt for vehicles.

FIGURE 8 is a cross-sectional view of a non-inflatable reelable structural member applicable to uses where wide members such as roof tops are required, and which may be improved by my invention.

FIGURE 9 corresponds to FIGURE 8 with the member shown partially in the collapsed condition which it assumes prior to being reeled.

FIGURE 10 shows an application of a reelable structural member of the type illustrated in FIGURE 7 to a safety belt for vehicles. It is shown spanning a vehicle between two opposite doors in front of occupants of a seat. (The seat is not shown.)

FIGURE 11 is a cross-sectional view, which corresponds to the view of FIGURE 6, showing a new method of interlocking interfaces of adjacent sheets or strips.

Figure 1:
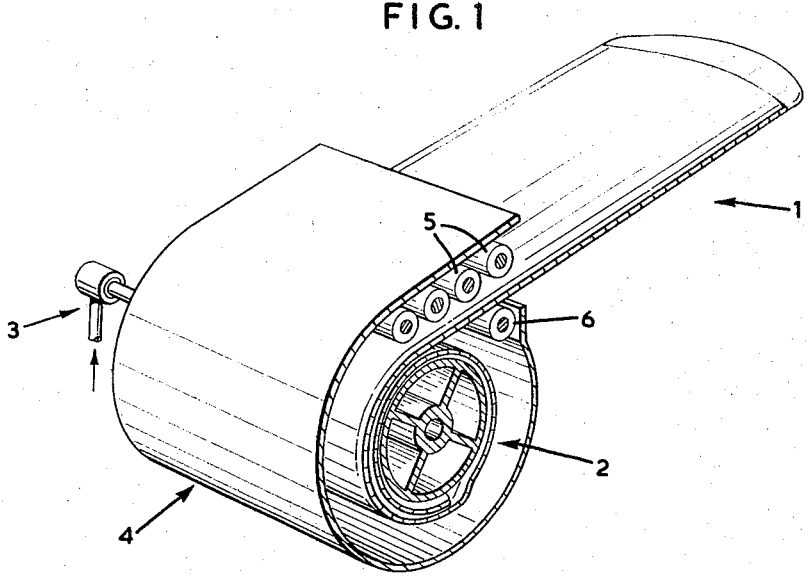
FIGURE 1 is a perspective view of a typical reelable structural member to which my invention is applicable.
Figure 3:
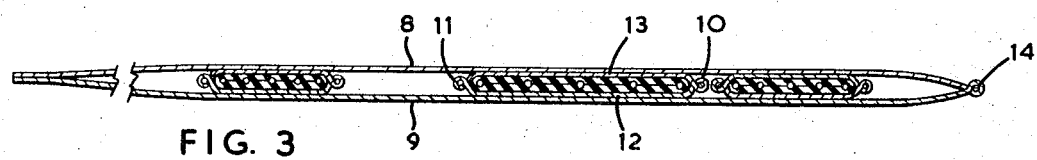
FIGURE 3 is a cross sectional view which illustrates the shape of the section of FIGURE 2 when it is collapsed.

FIGURE 12 is a cross-sectional view along the longitudinal direction of reelable structural members, such as those of FIGURES 1 and 3, and the illustrated modifications thereof, showing how adjacent sheets or strips may be interlocked while they are on the reel.

FIGURE 13 corresponds to FIGURE 12, but shows still another way of interlocking adjacent sheets while on the reel.

FIGURE 14 corresponds to FIGURE 12, but shows still another method of interlocking adjacent sheets while on the reel.

FIGURE 15 is a cross-sectional view of a new type of reelable structural member in which interfacial movement between the sheets is allowed to occur.

FIGURE 16 is a cross-sectional view of the reelable structural member of FIGURE 15 showing the member in the collapsed state when it is on the reel.

FIGURE 17 is a cross-sectional view of an alternative type of structural member in which interfacial movement between adjacent sheets is allowed to occur.

FIGURE 18 is a cross-sectional view of the reelable structural member of FIGURE 17 showing the member in the collapsed state when it is on the reel.

Before describing my invention the prior art in reelable structural members to which my invention is applicable will be briefly described.

A typical reelable structural member 1 of the inflatable types is shown in FIGURE 1. It essentially includes a reel 2 on which the member 1 is reeled for storage, a reel housing 4 for supporting the reel, and a fluid coupling 3 through which a fluid may be passed for inflating the member, and guide roller assemblies 5 and 6 for supporting the rigid section of the structural member projecting from the reel. The member 1 generally consists of stiffening means comprising the resilient elements 8 and 9, element connecting means 14 and 15 by means of which the elements are joined, shape controlling means 7 comprising one or more inflatable auxiliary members mounted between the elements 8 and 9, and sealing means 16 for preventing escape of fluid from the auxiliary inflatable members, when inflated. The auxiliary inflatable members generally comprise two resilient auxiliary elements 12 and 13, and auxiliary element joining means comprising the hinges 10 and 11. The sealing means 16 may comprise a tube as shown, or sealant applied locally in the area of the auxiliary element joining means.

Figure 4:
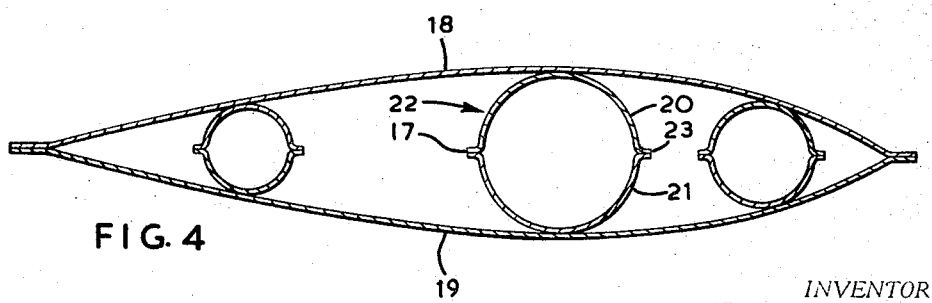
FIGURE 4 is a cross sectional view, corresponding to FIGURE 2, illustrating an alternative embodiment to which my invention is applicable.

An alternative reelable structural member is shown in FIGURE 4 and comprises two resilient sheets 18 and 19 which are joined by hinge means at the longitudinal edges as shown. (The term "longitudinal" as used throughout the specification and claims always refers to the general direction in a plane which is approximately at right angles to the axis of the reel and has no significance insofar as the dimensions of any component are concerned.) The shape controlling means 22 comprise one or more auxiliary inflatable members consisting of strips 20 and 21, and auxiliary element joining means 17 and 23, consisting of bonding, or seam welding and thereby eliminating the requirement for sealing means.

Figure 2:
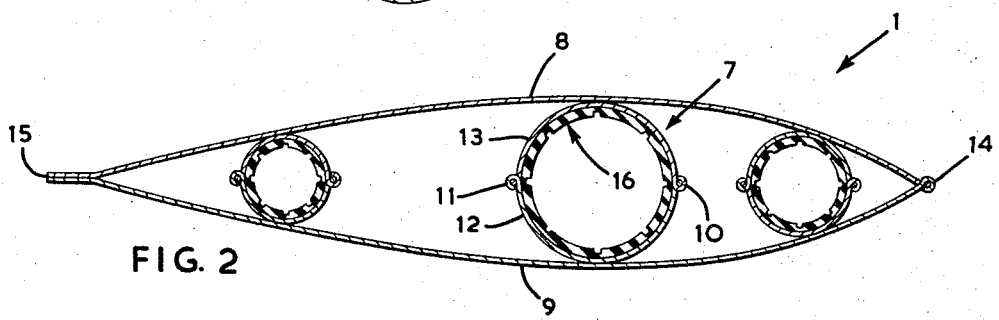
FIGURE 2 is a cross sectional view taken along the transverse axis of the projecting portion of the member 1 of FIGURE 1, which shows the components of the member, in the inflated state, to which my invention is applicable.

In operation a fluid is fed into the coupling 3 which communicates with the interior of the auxiliary members such as 16 of FIGURE 2 or 22 of FIGURE 4, thereby inflating these members and providing the shape of FIGURE 2, or 4, as shown.

A further innovation covered by the prior art is that the resilient sheets 8 and 9 may be preformed to the shape of FIGURE 2, and likewise the strips 12 and 13 of the auxiliary member 16 may be preformed to the shape shown in FIGURE 2. The member, then, does not require inflation means and naturally assumes the rigid shape of FIGURE 2 while off the reel, and the flexible shape of FIGURE 3 while on the reel. The same principle applies to the member of FIGURE 4.

A still further type of reelable member, now prior art, is shown in FIGURE 5. The member 28, shown in cross section in FIGURE 6, comprises two resilient precurled strips 29 and 30 mounted in a back-to-back relationship, as shown, which are rendered to a flexible state by member flattening means 26, and a reel 25, which is also used for storage. The reel 25 is supported in a housing 24 which also houses the member supporting means 27, which are in the form of roller assemblies.

A still further type of reelable member, now prior art, is the member 34, illustrated in the rigid state in FIGURE 8, and in the partially collapsed state in FIGURE 9. This member is specially suited for applications such as roof tops for vehicles, and comprises sheet means 38 and stiffening means consisting of pre-curled tubular members 35, 36, and 37, which are fastened to the sheet means by such means as rivets 39. The member 34 is completely flattened on the reel as shown in FIGURE 5.

Having described the prior art, the manner in which the aforesaid structural members may be improved will now be described. One of the most difficult problems associated with reelable structural members is that relative longitudinal motion tends to occur at the interface of adjacent sheets of such members as they enter the reel. This tends to buckle the sheets and to sever the element joining means. Several ways in which this may be prevented will now be described. Since these methods are applicable to all the reelable members of the prior art which have been described, only the basic principles involved will be described.

Referring first to FIGURE 12, a reel 55 is shown with two adjacent sheets 51 and 52 being reeled thereon. It will be evident that if these sheets were smooth surfaced, a relative motion would occur between the sheets as the reeling proceeds, since the diameter of the outer reeled sheet 51 is larger than the diameter of the inner reeled sheet 52. This in most reelable members is preferably avoided, for reasons already mentioned. This may be done by providing facial interlocking means which involve serrating the sheets 51 and 52 such that the square projections 54 of one sheet interlock with the square grooves 53 of the adjacent sheet. It will be evident then that the otherwise interfacial movement between the sheets is avoided, the two sheets being loaded by a shearing force transmitted through the projections 54.

With reference to the reelable structural members discussed in connection with the prior art, it will now be evident that the adjacent sheets 51 and 52 of FIGURE 12 may be regarded and correspond to adjacent sheets such as 8 and 13, and 9 and 12 of FIGURE 2, 20 and 21, 18 and 22, and 19 and 21 of FIGURE 3, 29 and 30 of FIGURE 6, and the sheets such as 36 and 38 of FIGURE 8.

Referring now to FIGURE 13, a second method of interlocking adjacent sheets will be described. Two adjacent sheets 56 and 57 are shown being reeled on the reel 60. Interfacial movement is avoided by using sawtoothed serrations with square faces, to prevent all disengaging forces; for instance, the square-faced tooth 58 of sheet 56 engages a similar shaped depression 59 in the sheet 57, when the sheets are reeled. Again, this principle is applicable to all the members illustrated in FIGURES 1 through 9.

Referring now to FIGURE 14, a third method of interlocking adjacent sheets will be described. Two adjacent sheets 61 and 62 are shown being reeled on the reel 65. Interfacial movement is avoided by providing the sheet 61 with numerous properly spaced round or square projections 63 which engage appropriately shaped holes 64 in sheet 62. Again, this principle is applicable to all the members illustrated in FIGURES 1 through 9.

An application of the aforesaid principle, which is specially applicable to the member 28 of FIGURE 5, is shown in FIGURE 11. The member 50 corresponds to the member 28, and comprises two normally outwardly curled sheets 46 and 47 fastened together by such means as rivets 86. The sheet 46 has projections 48 which engages holes 49 in sheet 47 when the member is flattened on the reel. By these means the otherwise high shearing stresses on the rivets 86 may be avoided, and consequently the member may be reeled on a smaller diameter reel.

A fourth method of interlocking interfaces of adjacent sheets has not been illustrated but may be understood with reference to FIGURE 3. This method comprises the treatment of adjacent surfaces of sheets with a high-friction coating, such as thin layer of rubber. Since a transverse force between sheets is inherently provided on the reel, this may be used to retard interfacial movement in some applications where large diameter reels are used, and, hence, interfacial shearing forces are of a low magnitude.

The preceding description pertains to reelable structural members in which interfacial movement between sheets has been deliberately prevented, and thereby permitting members of maximum rigidity and load carrying capacity to be made. Several types of reelable structural members will now be described in which interfacial movement between sheets is allowed to occur. This may be understood with reference to FIGURE 15. The reelable member 66, shown in cross section only, comprises two resilient strips or sheets 67 and 68 which are outwardly dished of their accord. The strips or sheets are joined by edge joining means comprising two curled eyes 69 and 70, which may be integral with sheet 67, which restrain beaded edges 71 and 72 of sheet 68. When this member is reeled it assumes the flattened shape shown in FIGURE 16 and interfacial movement between the sheets 67 and 68 occurs as the reeling progresses.

In applications where wide members are required, such as in roof tops for vehicles, shape controlling means 73 may be used to provide the proper shape and reduce vibration. The shape controlling means may comprise sponge rubber, as shown, which is compressible to a high degree without an appreciable force. If shape controlling means are used, the sheets 67 and 68 need not be dished outwardly of their own accord, since the dishing action may be provided by these means.

A second type of reelable member, in which interfacial movement between sheets is allowed to occur, is depicted in FIGURES 17 and 18. The member 74 essentially comprises a sheet 75 of resilient material which normally is flat or dished, as shown in FIGURE 17. This member has stiffening means in the form of one or more pre-dished sheets 76 and 77 which are interfacially slidably mounted with respect to sheet 75, by use of sliding joints 78, 79 and 80, the joints being rigidly fastened to the sheet 75. The sheet 76 has two beaded edges 81 and 82 and sheet 77 has similar beaded edges for restraining these sheets in the joints 78, 79 and 80. As this member 74 is reeled it is flattened as shown in FIGURE 18, and small relative motion between sheets 76, 77 and sheet 75 occurs both in the longitudinal and transverse directions. The member may be provided with collapsible rubber mouldings 83 and 84, bonded to the member, which eliminate the sharp edge effect, thereby making it more suitable for applications such as automobile roof tops.

Another type of reelable member, which is primarily intended to serve as a belt type gate or safety strap for vehicles, and is illustrated in FIGURES 7 and 10, will now be described. The member 31, FIGURE 7, comprises a pre-curled strip of resilient material 32 which may be enveloped with a suitable coating 33, such as rubber, to relieve the sharp edges. It will be evident that when such a member is reeled it flattens to the dotted configuration as shown.

The application of the member, described aforesaid, to automobile vehicles in lieu of conventional safety belts, may be understood with reference to FIGURE 10. This figure may be regarded as the plan view of the area in the vicinity of the front seat, the reference characters 43 and 44 referring to the doors. Mounted within the arm rest of one door 43 is a motorized reel 40 on which the reelable member 45 is stored when not in use. The reelable member 45 is essentially the same as the member 31 of FIGURE 7. When the member is required as a safety strap the motorized reel 40 extends the member until the latching pilot 41 of the member engages the latch 42 mounted in an arm rest of the door 44. In service the member 45 then essentially serves as a strap since its rigidity is negligible and only suffices to support itself in the rigid state while it traverses the vehicle. When the safety strap is not required, the latching means 42 are undone and the motorized reel 40 returns the member upon the reel.

It will be appreciated that many other applications of the device of FIGURE 10 are possible. For instance, the reference characters 43 and 44 may be the entrance to a property and the reelable member 45 then provides a strap-type gate for the entrance.

What I claim as my invention is:

1. A device which includes the combination of an inflatable structural member and storage means for storing said inflatable structural member in a flexible state and projecting it in a rigid state, said inflatable structural member including, in combination, stiffening means by means of which said inflatable structural member may be made rigid when inflated, said stiffening means comprising at least two resilient elements which are predominantly flat and in an overlying relationship when said inflatable structural member is in a flexible state and dished outwardly when said member projects from said storage means, element connecting means for connecting said resilient elements, element facial interlocking means for interlocking adjacent faces of said resilient elements when in said storage means, sealing means for retaining fluid within said inflatable structural member when inflated, said storage means including a reel on which said inflatable structural member may be reeled, housing means for supporting said reel, inflating means for inflating and deflating said inflatable structural member, and reel operating means.

2. The device of claim 1 in which said element facial interlocking means comprise projections on one said element engaging with depressions in said other element.

3. The device of claim 1 in which said element facial interlocking means comprise saw-tooth serration means on one said element engaging corresponding saw-tooth serration means on said other element.

4. The device of claim 1 in which said element facial interlocking means comprise square tooth serration means on one said element engaging square tooth serration means on said other resilient element.

5. The device of claim 1 which includes shape controlling means between said resilient elements which are oriented approximately parallel to the longitudinal axis of said inflatable structural member, said shape controlling means comprising at least one auxiliary inflatable member which consists of two auxiliary resilient elements which are predominantly flat and overlie each other when said inflatable structural member is deflated, auxiliary element joining means, sealing means for retaining fluid between said auxiliary resilient elements when said auxiliary inflatable member is inflated, auxiliary element interfacial locking means for interlocking adjacent faces of said auxiliary resilient elements when on said reel, said inflating means being the means whereby said auxiliary inflatable member is inflated and deflated, said auxiliary member controlling the extent of dishing of said resilient elements and thereby controlling the shape of said inflatable structural member.

6. The device of claim 5 in which said auxiliary element interfacial locking means comprise tooth-shaped means on one said element engaging tooth-shaped means on said other element.

7. A device which includes the combination of a reelable structural member and storage means for storing said reelable structural member in a flexible state and projecting it in a rigid state, said reelable structural member including, in combination, stiffening means by means of which said reelable structural member may be made rigid, said stiffening means comprising at least two resilient elements which are predominantly flat and in an overlying relationship when said reelable structural member is in said storage means, and dished outwardly when said member projects from said storage means, element connecting means for connecting said resilient elements, element facial interlocking means for interlocking adjacent faces of said resilient elements when on said reel, said storage means including a reel on which said reelable structural member may be reeled, housing means for supporting said reel and reel operating means.

8. The device of claim 7 in which said element facial interlocking means comprise projections on one said element engaging with depressions in said other element.

9. The device of claim 7 in which said element facial interlocking means comprise saw-tooth serration means on one said element engaging corresponding saw-tooth serration means in said other resilient element.

10. The device of claim 7 in which said element facial interlocking means comprise square tooth serration means in one said element engaging corresponding serration means in said other element.

11. The device of claim 7 which includes shape controlling means between said resilient elements which are oriented approximately parallel to the longitudinal axis of said reelable structural member, said shape controlling means comprising at least one auxiliary structural member which is located between said resilient elements and attached thereto, said auxiliary structural member comprising two auxiliary resilient elements which are predominantly flat and overlie each other when said reelable structural member is on said reel, auxiliary element joining means, interfacial element locking means for locking adjacent faces of said auxiliary resilient elements when on said reel, said auxiliary structural member controlling the extent to which said resilient elements dish from each other.

12. A device which includes the combination of a reelable structural member and storage means for storing said reelable structural member in a flexible state and projecting it in a structurally rigid state, said reelable structural member comprising two tubular-shaped members of resilient material, each said tubular-shaped member having a longitudinal slit in its wall, said tubular members being attached to each other in a back to back relationship with said slits facing in opposite directions, facial interlocking means for locking adjacent faces of said tubular members when they are forceably flattened against each other in said storage means, said storage means comprising a reel to which said reelable member is attached and upon which it may be wound, a housing supporting said reel, and means for rotating said reel.

13. The device of claim 12 in which said facial interlocking means comprise tooth-like means on one said tubular member engaging depressions in said other tubular member, when said tubular members are flattened against each other.

14. The device of claim 12 in which said facial interlocking means comprise projections on one said tubular member engaging holes in said other tubular member, when said tubular members are flattened against each other.

15. A device, which includes retractable roofs for vehicles, buildings and the like, which includes the combination of a reelable structural member and storage means for storing said reelable structural member in a flexible state and projecting it in a structurally rigid state and cantilever manner, said reelable structural member including sheet means, collapsible stiffening means which are oriented parallel to the longitudinal axis of said sheet means and attached to said sheet means to distend therefrom on the portion of said reelable structural member which projects from said storage means and collapse against said sheet means on the portion of said reelable structural member in said storage means, interlocking means for locking said stiffening means to said sheet means when said stiffening means are collapsed in said storage means, said storage means including a reel on which said reelable structural member is reeled and to which it is attached, housing means for supporting said reel, and reel rotating means whereby the length of said reelable structural member protruding from said storage means may be varied.

16. The device of claim 15 in which said collapsible stiffening means comprises at least one tubular-shaped member of resilient material with a longitudinal slit in its wall, said tubular shaped member being flattened on said reel, said interlocking means comprising projections on said sheet means engaging depressions in said tubular member when flattened on said reel, or projections on said tubular shaped member engaging depressions in said sheet means when said tubular shaped member is flattened on said reel.

17. The device of claim 15 in which said collapsible stiffening means comprises at least one tubular shaped member of resilient material with a longitudinal slit in its wall, said tubular shaped member being flattened on said reel, said interlocking means comprising tooth means on said sheet means engaging tooth means on said tubular shaped member when said member is on said reel.

18. A device, which includes retractable roofs for vehicles, buildings and the like, which at least includes the combination of a reelable structural member and storage means for storing said reelable structural member in a flexible state and projecting it in a structurally rigid state and cantilever manner, said reelable structural member at least comprising sheet means, collapsible stiffening means in association with and oriented parallel to the longitudinal axis of said sheet means, joint means for joining said stiffening means to said sheet means, said collapsible stiffening means being longitudinally slidable with respect to said sheet means in said joint means, said storage means including a reel on which said reelable structural member may be reeled and to which it is attached, housing means for supporting said reel, and reel rotating means whereby the length of said reelable structural member protruding from said storage means may be varied.

19. The device of claim 18 in which said collapsible stiffening means include inner sheet means in underlying relationship with said sheet means, said reelable structural member including shape controlling means consisting of a sponge type material between said sheet means and said inner sheet means.

20. The device of claim 18 in which said collapsible stiffening means are slidable in said joint means in both the longitudinal and transverse directions with respect to said sheet means.

References Cited by the Examiner

UNITED STATES PATENTS

| | | | |
|---|---|---|---|
| 1,806,859 | 5/1931 | Mattei | 114—117 |
| 1,915,632 | 6/1933 | Marks | 242—86 |
| 2,852,216 | 1/1958 | Peters | 137—355.23 X |
| 3,100,669 | 8/1963 | Monroe | 297—388 |
| 3,144,104 | 8/1964 | Weir et al. | 52—108 |
| 3,144,215 | 8/1964 | Klein | 242—54 |
| 3,252,173 | 5/1966 | Robinsky | 52—108 |

FRANK L. ABBOTT, *Primary Examiner.*

R. S. VERMUT, *Assistant Examiner.*